(12) United States Patent
Lim et al.

(10) Patent No.: US 10,977,450 B2
(45) Date of Patent: Apr. 13, 2021

(54) TERMINAL DEVICE AND METHOD FOR PROVIDING ADDITIONAL INFORMATION

(71) Applicant: Samsung Electronics Co., Ltd., Suwon-si (KR)

(72) Inventors: Haeng-sun Lim, Suwon-si (KR); Eun-ji Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 16/081,240

(22) PCT Filed: Mar. 24, 2017

(86) PCT No.: PCT/KR2017/003190
§ 371 (c)(1),
(2) Date: Aug. 30, 2018

(87) PCT Pub. No.: WO2017/188606
PCT Pub. Date: Nov. 2, 2017

(65) Prior Publication Data
US 2019/0073359 A1    Mar. 7, 2019

(30) Foreign Application Priority Data

Apr. 27, 2016    (KR) .......................... 10-2016-0051553

(51) Int. Cl.
*G06F 40/58* (2020.01)
*G06F 40/44* (2020.01)
*G06F 40/51* (2020.01)
*G06F 40/216* (2020.01)

(52) U.S. Cl.
CPC ............ *G06F 40/58* (2020.01); *G06F 40/216* (2020.01); *G06F 40/44* (2020.01); *G06F 40/51* (2020.01)

(58) Field of Classification Search
CPC .. G06F 17/2836; G06F 17/2872; G06F 40/40; G06F 40/47; G06F 40/58
See application file for complete search history.

(56) References Cited

U.S. PATENT DOCUMENTS

| 7,058,626 | B1 * | 6/2006 | Pan ........................ G06F 16/951 |
| 7,107,204 | B1 * | 9/2006 | Liu ........................ G06F 40/232 |
| | | | 704/2 |
| 7,672,831 | B2 | 3/2010 | Todhunter et al. |

(Continued)

FOREIGN PATENT DOCUMENTS

| JP | H07-105219 A | 4/1995 |
| JP | 2005-071017 A | 3/2005 |

(Continued)

*Primary Examiner* — Samuel G Neway
(74) *Attorney, Agent, or Firm* — Jefferson IP Law, LLP

(57) ABSTRACT

Disclosed are a terminal device and a method for providing additional information. A method for providing additional information of a terminal device comprises the steps of: obtaining a translation of a second language by translating an original text of a first language; extracting keywords from the translation of the second language; retrieving a text of the second language on the basis of a proportion including the extracted keywords; classifying the retrieved text on a sentence basis and determining a related sample sentence on the basis of the proportion including the extracted keywords on the sentence basis; and displaying the determined related sample sentence.

11 Claims, 7 Drawing Sheets

(56) References Cited

U.S. PATENT DOCUMENTS

| | | | |
|---|---|---|---|
| 8,386,234 B2 | 2/2013 | Uchimoto et al. | |
| 8,457,947 B2 | 6/2013 | Yang et al. | |
| 2004/0006560 A1* | 1/2004 | Chan | G06F 40/58 |
| 2004/0030542 A1* | 2/2004 | Fuji | G06F 40/47 |
| | | | 704/2 |
| 2005/0283365 A1* | 12/2005 | Mizutani | G10L 15/22 |
| | | | 704/257 |
| 2006/0217964 A1* | 9/2006 | Kamatani | G06F 40/55 |
| | | | 704/7 |
| 2007/0203688 A1* | 8/2007 | Fuji | G06F 40/40 |
| | | | 704/2 |
| 2011/0131032 A1 | 6/2011 | Yang et al. | |
| 2012/0022852 A1* | 1/2012 | Tregaskis | G06F 40/47 |
| | | | 704/3 |
| 2019/0073359 A1* | 3/2019 | Lim | G06F 40/44 |

FOREIGN PATENT DOCUMENTS

| | | |
|---|---|---|
| JP | 2007-025939 A | 2/2007 |
| JP | 2012-074087 A | 4/2012 |
| KR | 10-2011-0034797 A | 4/2011 |
| KR | 10-2012-0094562 A | 8/2012 |
| KR | 10-1301535 B1 | 9/2013 |
| WO | 2015/073318 A1 | 5/2015 |

\* cited by examiner

FIG. 5

Gartner, 2016 10 Strategic Technology Trends presentation

Gartner is defined as technology trends that can have a significant effect on the tissue for a " strategic technology trends.

10 described in the strategy, including IT technology trends are likely higher is confusing for business, whether requiring major financial investment, or the late adoption was selected that could lead to consideration of how these risks.

Gartner identifies the Top 10 Strategic Technology Trends for 2016

Gartner defines a strategic technology trend as one with the potential for significant impact on the organization.

Factors that denote significant impact include a high potential for disruption to the business, end users or IT, the need for a major investment, or the risk of being late to adopt.

Gartner, 2016 10 Strategic Technology Trends presentation

Gartner is defined as technology trends that can have a significant effect on the tissue for a " strategic technology trends.

10 described in the strategy, including IT technology trends are likely higher is confusing for business, whether requiring major financial investment, or the late adoption was selected that could lead to consideration of how these risks.

35

Gartner Identifies the Top 10 Strategic Technology Trends for 2016

Gartner defines a strategic technology trend as one with the potential for significant impact on the organization.

Factors that denote significant impact include a high potential for disruption to the business, end users or IT, the need for a major investment, or the risk of being late to adopt.

37

NEWS

Gartner Identifies the Top 10 Strategic Technology Trends...
www.gartner.com/newsroom/id/3143521
Oct 6, 2015 - Gartner Identifies the Top 10 Strategic Technology Trends for 2016...
Gartner defines a strategic technology trend as one with the potential for....
You've visited this page 3 times. Last visit: 10/20/15

TERMINAL DEVICE AND METHOD FOR PROVIDING ADDITIONAL INFORMATION

TECHNICAL FIELD

The present invention relates to a terminal device, and more particularly, to a terminal device for providing additional data related with translated content and method thereof.

BACKGROUND ART

Recent terminal devices perform a variety of functions. The functions performed at the terminal device include a translating function. A terminal device performing a general translating function translates words or sentences as inputted by a user into a desired target language. It may be convenient for a user because such terminal device provides translation in the desired target language within a short time, but the translated result is difficult to be relied on. Therefore, in order to enhance reliability of the translated result, a user first translates a document written in a first language into a third language, then translates the document translated in the third language into a second language which is the target language desired by the user, and compares the resultant translation with a direct translation of the first language into the second language. However, even after comparing the translated results in different routes, it is still difficult to rely on the translated result. Therefore, much time and efforts are needed for translation due to repetitive translating works. Further, a user may have a problem in understanding result of machine translation, since the machine translation provided by the terminal device can sometimes be out of context.

DETAILED DESCRIPTION

Technical Problem

Accordingly, an object of the present disclosure is to provide a terminal device capable of providing additional information to a user, thus enhancing reliability of a translated result and also facilitating understanding of the user regarding the translated result, and a method thereof for providing additional information.

Technical Solution

In order to accomplish the above-mentioned object, a method for providing additional information of a terminal device is provided, which may include the steps of obtaining a translation of a second language by translating an original text of a first language, extracting keywords from the translation of the second language, retrieving a text of the second language including the extracted keywords, classifying the retrieved text on a sentence basis and determining a related sample sentence on the basis of the proportion including the extracted keywords on the sentence basis, and displaying the determined related sample sentence.

Further, according to an embodiment, a terminal device may include a control unit configured to obtain a translation of a second language by translating an original text of a first language, extract keywords from the translation of the second language, retrieve a text of the second language including the extracted keywords, classify the retrieved text on a sentence basis and determine a related sample sentence on the basis of the proportion including the extracted keywords on the sentence basis, and a display unit configured to display the determined related sample sentence.

Advantageous Effects

According to the above various embodiments, the terminal device for providing additional information and the method thereof may enhance reliability of a translated result to a user, support understanding of a translated result, and provide related information more conveniently with additional information.

BRIEF DESCRIPTION OF THE DRAWINGS

FIG. 5 is a diagram illustrating a screen displaying additional information according to an embodiment.

FIG. 6 is a diagram illustrating a screen displaying additional information according to another embodiment.

BEST MODE

Figure 1:
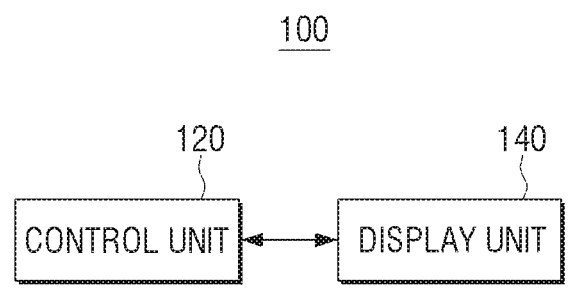
FIG. 1 is a block diagram of a terminal device according to an embodiment.

Hereinafter, embodiments of the present disclosure will be described in detail with reference to the accompanying drawings. Various modifications of the embodiments described herein may be contemplated. Specific embodiments may be illustrated in the drawings and explained in detail in the description. However, the specific embodiments disclosed in the attached drawings are provided to facilitate understanding of various embodiments of the present disclosure. Accordingly, the specific embodiment disclosed in the attached drawings may not limit the technical scope of the present disclosure, and rather be construed to encompass all equivalents or alternatives within the concept and technical scope of the present disclosure. In the following description of the present disclosure, a detailed description of known functions and configurations incorporated herein will be omitted when it may make the subject matter of the present disclosure rather unclear.

The expression, "first," "second," and so on may be used in describing a variety of elements, but these elements should not be limited to the expression. The expressions are used only for the purpose of distinguishing one element from another.

The expression 'comprise' or 'have' used herein are intended to designate an existence of steps, operations, elements, components or a combination of these, and accordingly, this should not be understood as precluding an existence or a possibility of adding one or more of other characteristics, numbers, steps, operations, elements, components or a combination of these. It should be understood that when an element is referred to as being "connected" or "coupled" to another element, it may be directly connected or coupled to another element, with or without yet another element being present in between. On the other hand, it should be understood that when an element is referred to as being "directly connected" or "directly coupled" to another element, there are no other element present in between.

Meanwhile, "module" or "unit" with respect to constituent elements used in the specification may perform at least one function or operation. Further, "module" or "unit" may perform function or operation with hardware, software, or combination of hardware and software. Further, except for a "module" or a "unit" performed at a specific hardware or at least one processor, a plurality of "modules" or "units" may be integrated into at least one module.

Unless otherwise specified, a singular expression includes a plural expression.

FIG. 1 is a block diagram of a terminal device according to an embodiment;

Referring to FIG. 1, the terminal device 100 includes a control unit 120 and a display unit 140.

The control unit 120 may obtain a translation of a second language by translating an original text of a first language. The original text of the first language may include text inputted by a user, web document retrieved through the Internet, text of an electronic book, or the like. The second language may be a target language into which the user wants the original text to be translated. For example, the terminal device 100 may perform translation on the basis of rules, perform translation on the basis of samples, and perform translation on the basis of statistics. Programs for translation or related information may be stored in a storage (not illustrated). The control unit 120 may obtain a translation by using the stored programs and related information in the storage and translating the original text of the first language into the second language desired by a user.

The control unit 120 may extract keywords from the translation of the second language. The keywords may refer to words or important words included in the translated sentences. For example, the control unit 120 may extract words included in a title as the keywords. Alternatively, the control unit 120 may extract keywords on the basis of a number of occurrences of the word. In other words, the control unit 120 may extract words that occur for at least a preset number of times as keywords. Alternatively, the control unit 120 may extract keywords by giving weight. For example, the control unit 120 may extract keywords by giving and applying 50% of weight with respect to words included in the title. The control unit 120 may extract the keywords and determine keywords to be used in retrieval. For example, the control unit 120 may determine keywords on the basis of a number of occurrences of the words, by determining the words used for at least 10 times as keywords to be used in retrieving, or determine keywords on the basis of a frequency of the words, by determining 10 words with highest frequency to be the keywords to be used in retrieving. The number of occurrences or a number of keywords to be used in retrieving described above are merely one of embodiments, since they may be determined according to user setting or tests.

The control unit 120 may retrieve a text of the second language including the extracted keywords. The extracted keywords are extracted from the translation of the second language. Accordingly, the control unit 120 may retrieve the text of the second language by using the extracted keywords. According to an embodiment, the control unit 120 may retrieve the text including all the extracted keywords. Alternatively, the control unit 120 may retrieve a text having a higher absolute proportion of including the extracted keywords than a preset proportion. For example, when a number of the extracted keywords is 10 and a number of the texts to be retrieved is 3, the control unit 120 may find a first text having 9 keywords, a second text having 7 keywords, a third text having 6 keywords, and a fourth text having 4 keywords. In this case, the control unit 120 may determine the first text, the second text, and the third text to be retrieved texts. Alternatively, the control unit 120 may retrieve a text having a higher relative proportion of including the extracted keywords than the other texts. For example, a number of texts to be retrieved by the control unit 120 may be 1, and the control unit 120 may find a fifth text of 10 sentences having 5 keywords (or 5 occurrences of keyword) and a sixth text of 20 sentences having 5 keywords (or 5 occurrences of keyword). On the basis of an absolute proportion, the fifth text and the sixth text have the same proportion of included keywords. However, on the basis of a relative proportion, a proportion of keywords included in the fifth text is higher than a proportion of keywords included in the sixth text, and the control unit 120 may determine the fifth text to be a retrieved text. The text of the second language as found may include a same keyword a plurality of times. The control unit 120 may regard the plurality of inclusions of the same keyword as one inclusion or as a plurality of inclusions. The control unit 120 may retrieve one text or a plurality of texts.

The control unit 120 may classify the retrieved text on a sentence basis. Even when the control unit 120 retrieves a plurality of texts, the texts are classified on the basis of one text, i.e., classified on a sentence basis included in one single text. Further, the control unit 120 may first classify a text having a highest number (or proportion) of included keywords on a sentence basis. The control unit 120 may perform the same process with respect to all of the retrieved texts.

Further, the control unit 120 may determine a sample sentence related with the original text on the basis of a proportion including the extracted keywords on the basis of the classified sentence. For example, the original text may include three sentences. Further, the control unit 120 may obtain a translation including three sentences which are translated from the original text. A first sentence of the original text may correspond to a first sentence of the translation, a second sentence of the original text may correspond to a second sentence of the translation, and a third sentence of the original text may correspond to a third sentence of the translation. Further, the control unit 120 may retrieve a text by extracting keywords from the translation and classify sentences in a higher order on the basis of a number (or proportion) of included keywords. For example, a keyword of the first sentence in the translation may be included most frequently in the fifth sentence of the second text, a keyword of the second sentence in the translation may be included most frequently in the second sentence of the third text, and a keyword of the third sentence in the translation may be included most frequently in the seventh sentence of the first text. Accordingly, a sample sentence related with the first sentence of the original text may be the fifth sentence of the second text, a sample sentence related with the second sentence of the original text may be the second sentence of the third text, and a sample sentence related with the third sentence of the original text may be the seventh sentence of the first text.

Referring to FIG. 1, an embodiment will be described below, in which keywords are extracted after an original text is translated, and then a text is retrieved by using the extracted keywords, and then sentences of the retrieved texts are classified on the basis of a preset standard. Although it will be further explained below, the terminal device 100 may transmit the retrieved text to an external device (e.g., server), and the external device may classify sentences in a higher order on the basis of a number (or proportion) of included keywords and transmit the same to the terminal device 100. Alternatively, the terminal device 100 may extract keywords from the translation and transmit the same to an external device, and the external device may retrieve a text by using the transmitted keywords, classify sentences in a higher order on the basis of a number (or proportion) of included keywords and transmit the same to the terminal device 100. Alternatively, the terminal device 100 may transmit the original text to an external device, and the external device may translate the original text to generate a translation, and perform processes of text retrieving, keyword extracting, and sentence classifying on the basis of a preset standard.

The display unit 140 may display the determined related sample sentence. The display unit 140 may display data according to controlling of the control unit 120. The control unit 120 may match a sentence included in at least one of the original text and the translation of the second language with the determined related sample sentence by using the extracted keywords. The control unit 120 may control the display unit 140 to display a sentence included in at least one of the original text and the translation of the second language together with the matched related sample sentence in parallel. In other words, the display unit 140 may display the original text together with the determined related sample sentence, and display the translation together with the determined related sample sentence. Alternatively, the display unit 140 may display the original text, the translation, and the determined related sample sentence together. The display unit 140 may divide a text on a sentence basis and display the result. Further, the display unit 140 may display corresponding sentences of the original text, the translation or the related sample sentences together.

For example, the display unit 140 may include at least one of a liquid crystal display (LCD), a thin film transistor-liquid crystal display (TFT LCD), an organic light-emitting diode (OLED), a flexible display, a 3D display, and an e-ink display.

Further, more than two display units 140 may be provided according to implementation of the terminal device 100. In this case, a plurality of display units may be disposed on one side of the terminal device 100 at intervals or as an integrated body, or may be respectively disposed on different sides from each other.

Figure 2:
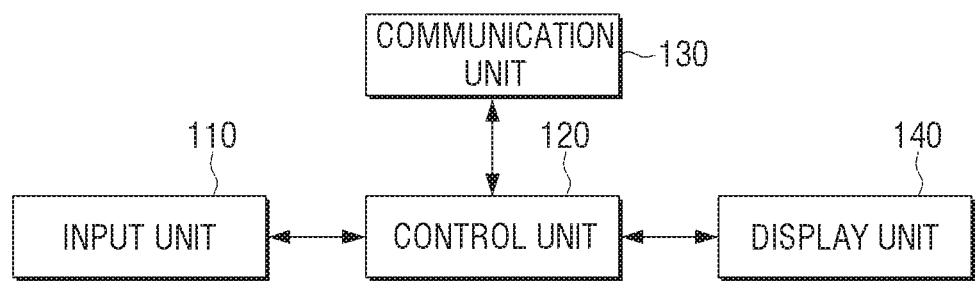
FIG. 2 is a block diagram of a terminal device according to another embodiment.

FIG. 2 is a block diagram of a terminal device according to another embodiment.

Referring to FIG. 2, the terminal device 100a may include an input unit 110, a control unit 120, a communication unit 130, and a display unit 140. According to an embodiment, the terminal device 100a may receive input of an original text of a first language from a user input or from an external device. The control unit 120 may implement a document write program according to a user command. The input unit 110 may generate an original text of a first language by receiving characters of the first language inputted from a user. Alternatively, the terminal device 100a may display documents retrieved through web surfing, documents included in applications or contents or the like. The input unit 110 may receive a command to select a displayed document or select a portion of the displayed document inputted from a user. The control unit 120 may determine that the selected document or a portion of the selected document is the original text of the first language. Alternatively, the communication unit 130 of the terminal device 100a may receive the original text of the first language from an external device.

The control unit 120 may obtain a translation of a second language by translating the original text of the first language. Further, the control unit 120 may extract keywords from the translation of the second language.

According to an embodiment, the terminal device 100a may retrieve a text of the second language through an external device. The communication unit 130 may transmit keywords and retrieve request signals to an external device. An external device (not illustrated) may retrieve a text of the second language including keywords by using the keywords received from the terminal device 100a. The external device may transmit the retrieved text of the second language to the terminal device 100a. The communication unit 130 of the terminal device 100a may receive the retrieved text of the second language from the external device. The control unit 120 may classify the received text on a sentence basis, and determine a sample sentence related with the original text on the basis of a proportion including the extracted keywords on the classified sentence basis. The display unit 140 may display the determined related sample sentence.

According to another embodiment, an external device (not illustrated) may perform processes of translating and determining a related sample sentence. The input unit 110 may receive user input or a command directing to select the displayed documents. The control unit 120 may determine that the document written or selected by the user input is the original text of the first language. According to a user command directing to translate, the communication unit 130 may transmit the determined original text of a first language to an external device.

The external device may receive the original text of the first language from the terminal device 100a and obtain a translation of the second language. The external device may extract keywords from the translation of the second language, and retrieve the text of the second language including the extracted keywords. The external device may classify the retrieved text on a sentence basis. The external device may determine a sample sentence related with the original text on the basis of a proportion including the extracted keywords on the basis of the classified sentence. An external device may transmit at least one text of the determined related sample sentence and the translation of the second language to the terminal device 100a. The terminal device 100a may display the received related sample sentence. The terminal device 100a may display the received related sample sentence together with at least one of the original text and the translation of the second language.

Although the input unit 110 and the communication unit 130 are explained in FIG. 2, the terminal device 100 illustrated in FIG. 1 may also include at least one of the input unit 110 and the communication unit 130. Accordingly, the terminal device 100 illustrated in FIG. 1 may receive user input, transmit data to an external device, and receive the transmitted data.

Figure 3:
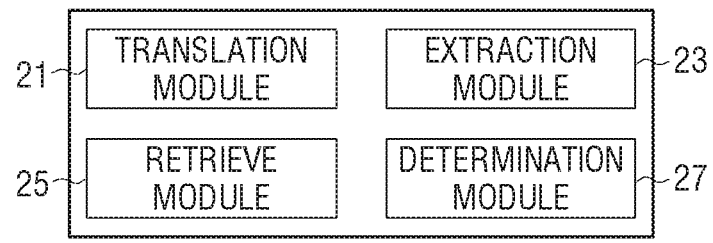
FIG. 3 is a block diagram illustrating detailed constitution of a terminal device according to an embodiment.

FIG. 3 is a block diagram illustrating detailed constitution of a terminal device according to an embodiment.

The respective operations of the terminal device 100 may be performed at a software module. The terminal device 100 may include software module for performing the process of translating or determining a related sample sentence. According to an embodiment, the terminal device 100 may include a translation module 21, an extraction module 23, a retrieve module 25, and a determination module 27.

The translation module 21 may obtain a translation of a second language by translating an original text of a first language. The translation module 21 may obtain a translation by using the stored programs and related information in the storage (not illustrated) and translating the original text of the first language into the second language desired by a user. The extraction module 23 may extract keywords from the translation of the second language. According to an embodiment, the extraction module 23 may extract keywords on the basis of words included in a title of the translated text, a number of occurrences of the words, a frequency of occurrences of the words, or the like.

The retrieve module 25 may retrieve a text of the second language including the extracted keywords. According to an embodiment, the retrieve module 25 may determine the text of the second language to be a text having a higher absolute proportion of including the extracted keywords than a preset proportion. In other words, the retrieve module 25 may determine a text of the second language including a higher number of keywords than a preset number. Alternatively, the retrieve module 25 may rank the texts of the second language on the basis of a higher number of included keywords, and determine the text of the second language to be the texts from a top rank to a predetermined rank. Alternatively, the retrieve module 25 may determine the text of the second language to be a text having a higher relative proportion of including the extracted keywords than a preset proportion. In other words, the retrieve module 25 may calculate a proportion of included keywords among all the words included in the text. The retrieve module 25 may determine the text of the second language to be the text having a higher portion of including keywords than a preset proportion. Alternatively, the retrieve module 25 may rank the texts on the basis of a higher proportion of including keywords, and determine the text of the second language to be the texts from a top rank to a predetermined rank.

The determination module 27 may classify the retrieved text of the second language on a sentence basis, and determine a sample sentence related with the original text on the basis of a proportion including the extracted keywords on the classified sentence basis. According to an embodiment, the determination module 27 may calculate proximity to a sentence of the original text on the basis of a number of keywords included in the classified sentence. In other words, the determination module 27 may calculate proximity to a sentence of the original text on the basis of an absolute proportion of the extracted keywords. The determination module 27 may perform the same process with respect to all the retrieved texts of the second language, and determine that a sentence having a highest proximity is a representative sample sentence related with a sentence of the original text. Further, the determination module 27 may determine a plurality of related sample sentences on the basis of proximity. Accordingly, the determination module 27 may determine that a sentence having a higher absolute proportion of including extracted keywords than a preset proportion is a sample sentence related with the original text.

Alternatively, the determination module 27 may calculate proximity to a sentence of the original text on the basis of a proportion of included keywords compared to total words within the classified sentence. In other words, the determination module 27 may calculate proximity to a sentence of the original text on the basis of a relative proportion of the extracted included keywords. The determination module 27 may perform the same process with respect to all the retrieved texts of the second language, and determine that a sentence having a highest proximity is a representative sample sentence related with a sentence of the original text. Further, the determination module 27 may determine a plurality of related sample sentences on the basis of proximity. Accordingly, the determination module 27 may determine that a sentence having a higher relative proportion of the extracted included keywords than the other sentences is a sample sentence related with the original text.

The terminal device 100 may display the determined related sample sentence together with at least one text of the original text and the translation.

Figure 4:
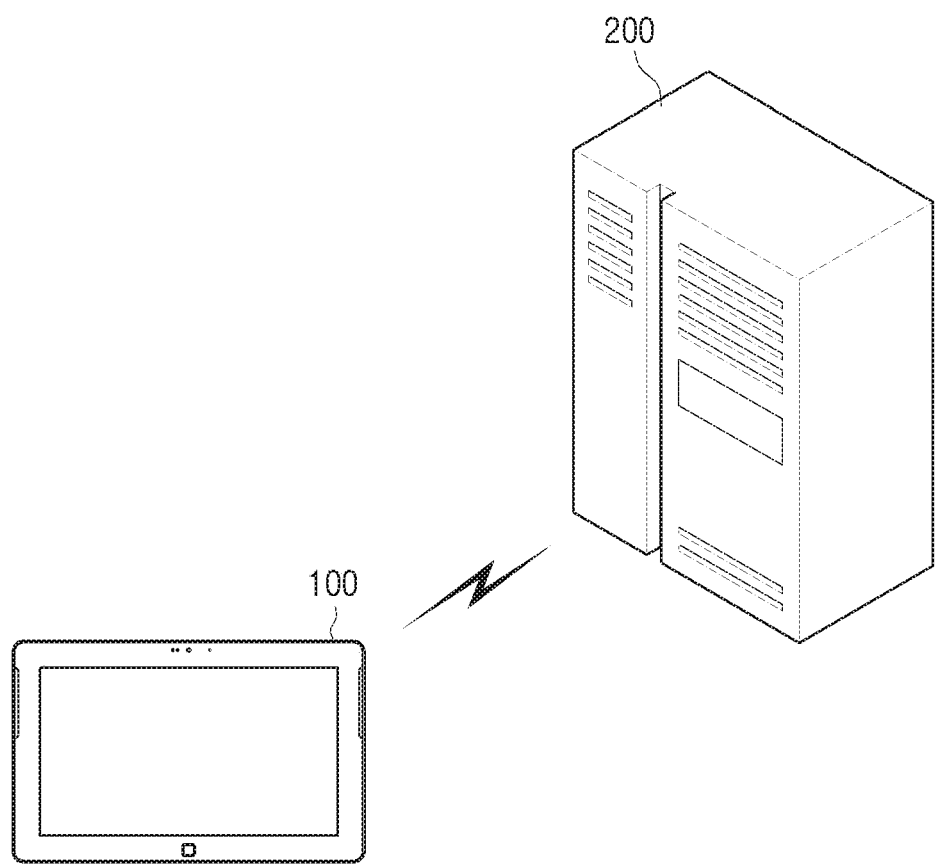
FIG. 4 is a diagram illustrating a translation system according to an embodiment.

FIG. 4 is a diagram illustrating a translation system according to an embodiment.

Referring to FIG. 4, the translation system may include a terminal device 100 and an external device 200.

According to an embodiment, the terminal device 100 may transmit an original text of a first language to the external device 200. The external device 200 may receive the original text of the first language from the terminal device 100 and obtain a translation by translating the received text into a second language. The external device 200 may extract keywords from the obtained translation. The external device 200 may retrieve a text of the second language on the basis of the extracted keywords. The external device 200 may classify the retrieved text on a sentence basis, and determine a sample sentence related with the original text on the basis of a proportion including the extracted keywords on the classified sentence basis. The external device 200 may transmit the translation of the second language and the determined related sample sentence to the terminal device 100. The terminal device 100 may receive the translation of the second language and the determined related sample sentence from the external device 200, and display the received related sample sentence together with at least one text of the original text and the translation.

According to another embodiment, the terminal device 100 may translate the original text of the first language into the translation of the second language, and transmit the translation of the second language to the external device 200. The external device 200 may receive the translation of the second language, and extract keywords from the translation. The external device 200 may perform the above processes by using the extracted keywords, and determine a sample sentence related with the original text. The external device 200 may transmit the translation of the second language and the determined related sample sentence to the terminal device 100. The terminal device 100 may display the received related sample sentence.

According to another embodiment, the terminal device 100 may translate the original text of the first language into the translation of the second language, and extract keywords from the translation. The terminal device 100 may transmit extracted keywords to the external device 200. The external device 200 may retrieve a text of the second language by using the received keywords, and determine a sample sentence related with the original text by performing the above processes. The external device 200 may transmit the determined related sample sentence to the terminal device 100, and the terminal device 100 may display the received related sample sentence together with at least one text of the original text and the translation.

According to various embodiments of the present disclosure, the terminal device may perform both of the translation process and the related sample determination process, or perform the translation process only. Alternatively, the terminal device may perform the related sample determination process only.

FIG. 5 is a diagram illustrating a screen displaying additional information according to an embodiment.

Referring to FIG. 5, the display unit may display an original text 31, a translation 33, and a related sample sentence 35. In some examples, the display unit may display only a related sample sentence. Alternatively, the display unit may display the original text together with the related sample sentence, or display the translation together with the related sample sentence.

As described above, the terminal device may match a sentence included in at least one of the original text and the translation of the second language with a related sample sentence, and display the matched related sample sentence together with a sentence included in at least one of the original text and the translation of the second language in parallel.

According to an embodiment, the original text 31 of FIG. 5 includes three sentences. The terminal device may translate the original text into the translation 33. The translation 33 may include three sentences corresponding to the original text 31. The terminal device may retrieve a text by using keywords and determine a related sample sentence 35 corresponding to the original text 31 by using keywords. The terminal device may determine a plurality of related sample sentences on the basis of a proportion including the extracted keywords on the basis of the classified sentence. However, the terminal device may display only one representative related sample sentence per sentence. The terminal device may display a first sentence of the translation 33 corresponding to a first sentence of the original text 31 and a first sentence of the related sample sentences in parallel. The terminal device may display a second sentence and a third sentence in the same manner. That is, the terminal device may match a related sample sentence with a sentence included in at least one of the original text 31 and the translation 33 by using extracted keywords. Further, the terminal device may display a sentence included in at least one of the original text 31 and the translation 33 with the related sample sentence 35 in parallel.

Further, the terminal device may display a renew button on an area of the related sample sentence 35. When the renew button is selected, the terminal device may sequentially display a plurality of related sample sentences respectively corresponding to sentences.

FIG. 6 is a diagram illustrating a screen displaying additional information according to another embodiment.

Referring to FIG. 6, the terminal device may display an original text 31, a translation 33, a related sample sentence 35 and a type-classified text 37. In other words, the terminal device may display the type-classified text 37 in addition to the original text 31, the translation 33 and the related sample text 35. In some examples, at least one of the original text 31, the translation 33 and the related sample sentence 35 may be omitted from the screen.

The terminal device may retrieve a text of the second language by using keywords. The terminal device may determine a related sample sentence on a keyword basis, on the basis of a proportion of including keywords on the basis of sentence included in the text. Further, the terminal device may classify the retrieved texts of the second language according to types of the texts. For example, the text type may include news, research paper, dictionary, web document, magazine, book or the like. The terminal device may classify the retrieved texts according to the types, and display the retrieved texts included in the selected text type according to a user command. For example, when a user selects a news type text, the terminal device may display the text 37 included in the news type.

Meanwhile, when retrieving a text of the second language, the terminal device may use different search engines according to types of the second languages. For example, when the second language is English, the terminal device may retrieve by using Google®. When the second language is Korean, the terminal device may retrieve by using Naver®, and when the second language is Chinese, the terminal device may retrieve by using Baidu®. The above examples are provided according to one embodiment, and it will be understood that the terminal device may use a plurality of search engines.

Figure 7:
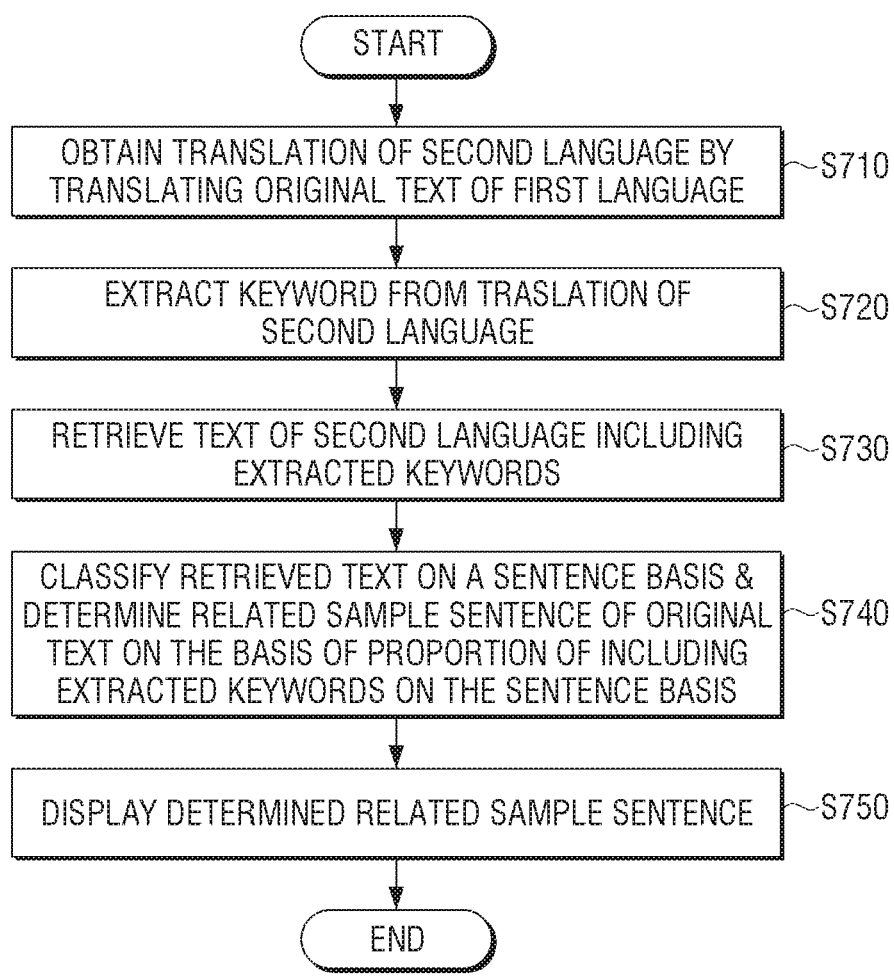
FIG. 7 is a flowchart provided to explain a method for providing additional information according to an embodiment.

FIG. 7 is a flowchart provided to explain a method for providing additional information according to an embodiment.

Referring to FIG. 7, the terminal device may obtain a translation of a second language by translating an original text of a first language, at S710. The terminal device may extract keywords from the translation of the second language, at S720. The terminal device may extract keywords based on at least one of the words included in the title, and words that occur at least a preset number of times in the translated text.

The terminal device may retrieve a text of the second language including the extracted keywords, at S730. The terminal device may retrieve a text as a sample sentence related with the original text, when the text satisfies one of the following: an absolute proportion of including extracted keywords is higher than a preset proportion; and a relative proportion of including extracted keywords is higher than the other texts.

The terminal device may classify the retrieved text on a sentence basis and determine a related sample sentence on the basis of the proportion including the extracted keywords on the sentence basis, at S740. The terminal device may determine that a sentence is a sample sentence related with the original text when the sentence satisfies one of the following: an absolute proportion of extracted included keywords is higher than a preset proportion; and a relative proportion of extracted included keywords is higher than the other sentences. The terminal device may determine a plurality of related sample sentences on the basis of a proportion including the extracted keywords on the basis of the classified sentence.

The terminal device may display the determined related sample sentence, at S750. The terminal device may display the related sample sentence together with at least one of the original text and the translation of the second language. The terminal device may match a sentence included in at least one of the original text and the translation of the second language with the related sample sentence by using the extracted keywords. The terminal device may display the matched related sample sentence and a sentence included in at least one of the original text and the translation of the second language in parallel. Displaying "in parallel" refers to separating sentence by sentence and displaying a corresponding sentence of the original text, a sentence of the translation and a sentence of the related sample sentence together. The terminal device may sequentially display a plurality of determined related sample sentences according to user input.

Meanwhile, the terminal device may display the retrieved texts that are classified by types. For example, the text type may include at least one of news, research paper, dictionary, web document, magazine, book or the like. The terminal device may classify the retrieved texts according to the types, and display the retrieved texts included in the selected text type according to a user command.

The method for providing additional information according to the various embodiments described above may be implemented to be a program and provided on the terminal device. For example, a non-transitory computer readable medium storing a program for performing the process of providing additional information may be provided.

The non-transitory computer readable medium is a medium capable of storing data semi-permanently and being readable by a device, rather than a medium such as register, cash, and memory that stores the data for a brief period of time. In particular, the various applications or programs described above may be stored and provided on a non-transitory computer readable medium such as CD, DVD, hard disk, Blu-ray disk, USB, memory card, ROM, and so on.

Further, while the present disclosure has been described in detail above, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A method for providing additional information of a terminal device, the method comprising:
    controlling a translation processor module for translating a first text written in a first language into a second text written in a second language, wherein the first text includes a first sentence written in the first language and the second text includes a second sentence, wherein the second sentence comprises a translation of the first sentence into the second language;
    controlling an extraction processor module for extracting a plurality of keywords from the second text written in the second language, wherein a keyword is a word included in the second text for at least a preset number of times;
    controlling a retrieve processor module for retrieving a third text including the plurality of keywords, wherein the third text comprises a plurality of sentences including the plurality of keywords;
    controlling a determination processor module for identifying a third sentence of the plurality of sentences included in the third text, wherein the third sentence is identified based on a plurality of keywords included in the second sentence; and
    controlling a display for displaying the third sentence with the first sentence and the second sentence.

2. The method of claim 1, wherein the displaying of the third sentence with the first sentence and the second sentence comprises:
    matching a sentence included in at least one of the first text or the second text with the third sentence by using the extracted plurality of keywords; and
    displaying a sentence included in the first text and the second text with the matched third sentence in parallel.

3. The method of claim 1, wherein the retrieving of the third text comprises:
    retrieving the third text of the second language when the third text satisfies one of:
        a relative proportion of the third text in the sentence including the extracted plurality of keywords is higher than other texts, or
        an absolute proportion of the third text in the sentence including the extracted plurality of keywords is higher than a preset proportion.

4. The method of claim 1, wherein the identifying of the third sentence comprises identifying that a sentence is the third sentence related with the second sentence when the sentence satisfies one of:
    an absolute proportion of the third sentence in the third text including the extracted plurality of keywords is higher than a preset proportion, or
    a relative proportion of the third sentence in the third text including the extracted plurality of keywords is higher than the other sentences.

5. The method of claim 1,
    wherein the identifying of the third sentence comprises identifying a plurality of third sentences based on a proportion of the third text in the sentence including the extracted plurality of keywords, and
    wherein the displaying the third sentence comprises sequentially displaying a plurality of identified third sentences according to a user input.

6. The method of claim 1, further comprising:
    classifying third texts by types; and
    displaying the third sentence in the third text corresponding to a type selected according to a user command.

7. The method of claim 6, wherein the types of the third texts comprise at least one of news, research paper, dictionary, web document, magazine, or book.

8. The method of claim 1, wherein the retrieving a of the third text comprises using different search engines according to a type of the second language.

9. A terminal device, comprising:
    at least one processor configured to:
        control a translation module to translate a first text written in a first language into a second text written in a second language, wherein the first text includes a first sentence written in the first language and the second text includes a second sentence, wherein the second sentence comprises a translation of the first sentence into the second language,
        control an extraction processor module to extract a plurality of keywords from the second text written in the second language, wherein a keyword is a word included in the second text for at least a preset number of times,
        control a retrieve processor module to retrieve a third text including the plurality of keywords, wherein the third text comprises a plurality of sentences including the plurality of keywords, and
        control a determination processor module to identify a third sentence of the plurality of sentences included in the third text, wherein the third sentence is identified based on a plurality of keywords included in the second sentence; and
    a display configured to display the third sentence with the first sentence and the second sentence.

10. The terminal device of claim 9, wherein the at least one processor is further configured to:
    use the extracted keywords to match a sentence included in at least one of the first text or the second text with the identified third sentence, and
    display the matched third sentence together with a sentence included in the first text or the second text in parallel.

11. The terminal device of claim 9, wherein the at least one processor is further configured to retrieve the third text of the second language related with the first text, when the third text satisfies one of:
    an absolute proportion of the third text in the sentence including the extracted plurality of keywords is higher than a preset proportion, or a relative proportion of the third text in the sentence including the extracted plurality of keywords is higher than the other texts.

\* \* \* \* \*